(12) United States Patent
Vaner et al.

(10) Patent No.: US 11,736,528 B2
(45) Date of Patent: Aug. 22, 2023

(54) LOW LATENCY CLOUD-ASSISTED NETWORK SECURITY WITH LOCAL CACHE

(71) Applicant: Avast Software s.r.o., Prague (CZ)

(72) Inventors: Michal Vaner, Prague (CZ); Jiří Horký, Přerov (CZ)

(73) Assignee: Avast Software s.r.o., Prague (CZ)

( * ) Notice: Subject to any disclaimer, the term of this patent is extended or adjusted under 35 U.S.C. 154(b) by 230 days.

(21) Appl. No.: 17/138,473

(22) Filed: Dec. 30, 2020

(65) Prior Publication Data

US 2022/0210197 A1 Jun. 30, 2022

(51) Int. Cl.
*H04L 9/40* (2022.01)
*H04L 67/5682* (2022.01)

(52) U.S. Cl.
CPC .......... *H04L 63/20* (2013.01); *H04L 63/0236* (2013.01); *H04L 63/1408* (2013.01); *H04L 67/5682* (2022.05)

(58) Field of Classification Search
CPC .. H04L 63/0236; H04L 63/20; H04L 63/1433

USPC ............................................................ 726/1
See application file for complete search history.

(56) References Cited

U.S. PATENT DOCUMENTS

2017/0264553 A1* 9/2017 Ni ........................... H04L 12/64
2019/0349404 A1* 11/2019 Jain ....................... H04L 9/3278

\* cited by examiner

*Primary Examiner* — Anthony D Brown
(74) *Attorney, Agent, or Firm* — Avek IP, LLC; William B. Kircher (57) ABSTRACT

Latency in a cloud security service provided via a network security device is reduced by receiving in the network security device a new network connection request for a connection between a local network device and a remote server. If a locally cached rule is applicable to the new network connection request, the applicable locally cached rule is applied to selectively allow the new network connection based on the rule. If no locally cached rule is applicable to the new network connection request, the new network connection request is forwarded to the remote server and to a cloud security service, and a response from the remote server is selectively forwarded to the local network device only upon receiving a determination by the cloud security device as to whether the new network connection is a security risk.

20 Claims, 3 Drawing Sheets

LOW LATENCY CLOUD-ASSISTED NETWORK SECURITY WITH LOCAL CACHE

FIELD

The invention relates generally to computer network security, and more specifically to providing low latency cloud-assisted security such as through a security, appliance.

BACKGROUND

Computers are valuable tools in large part for their ability to communicate with other computer systems and exchange information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables billions of people to access billions of other computers such as by viewing web pages, sending e-mail, engaging in e-commerce, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps, and used for purposes such as to steal personally identifiable information or to establish botnets that perform undesirable tasks such as sending spam emails or mining cryptocurrency. Further, legitimate computer users within an organization such as a corporation may on occasion attempt to perform unauthorized network communications, such as running file sharing programs, copying corporate secrets, or misusing personal information of users or customers.

Many computer systems employ a variety of safeguards designed to protect computer systems against such threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, security appliances can use sophisticated techniques such as ARP spoofing or DNS redirection to monitor or control the content that is delivered to client devices on a private network, protecting the client devices from malicious websites and other online threats.

For example, a firewall in a home or office may restrict the types of connection and the data that can be transferred between the internal network and an external or public network such as the Internet, based on firewall rules and characteristics of known malicious data. Security devices such as a firewall are typically computerized network devices that inspect network traffic that passes through, permitting passage of desirable network traffic while blocking undesired network traffic based on a set of rules. A network security device may be integrated into a home or small business router, or may be a standalone device such as a device connected to a router and configured to filter traffic coming into a private network from a public network before forwarding it to devices on the private network. But, such security devices often have limited computational power in a home or small business setting due to cost and other constraints, and often rely on remote or cloud servers for a significant part of the threat analysis they facilitate. Waiting for authorization from a cloud server before forwarding public network traffic to devices on a local network can result in undesirably long delays or latency, negatively impacting user experience with such security solutions.

It is therefore desirable to manage or reduce latency when implementing a security solution using cloud-based resources such as for network traffic content analysis.

SUMMARY

One example embodiment of the invention comprises reducing latency in a cloud security service provided via a network security device by receiving in the network security device a new network connection request for a connection between a local network device and a remote server. If a locally cached rule is applicable to the new network connection request, the applicable locally cached rule is applied to selectively allow the new network connection based on the rule. If no locally cached rule is applicable to the new network connection request, the new network connection request is forwarded to the remote server and to a cloud security service, and a response from the remote server is selectively forwarded to the local network device only upon receiving a determination by the cloud security device as to whether the new network connection is a security risk.

In a further example, a new locally cached rule is selectively stored based at least in part on the received data related to the security of the new network connection request from the cloud security device.

In another example, the network security device receives information related to whether to allow storing a decision regarding allowing the new network connection request as a locally cached rule from the cloud security service. In a further example, the locally cached rule applies to future events meeting similarity criteria relative to the new network connection, the similarity criteria comprising at least one of server identity, IP address, root domain, port number, protocol, and packet content.

In some examples, the local cache comprises rules related to one or more network destinations based on at least one of network destinations commonly visited across a group of users and network destinations commonly visited on one or more local machines.

The details of one or more examples of the invention are set forth in the accompanying drawings and the description below. Other features and advantages will be apparent from the description and drawings, and from the claims.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to a corporate computer to steal, delete, or change information, or to encrypt the information and hold it for ransom via "ransomware." Smartphone apps, Microsoft Word documents containing macros, Java applets, and other such common documents are all frequently infected with malware of various types, and users rely on tools such as antivirus software or other malware protection tools to protect their computerized devices from harm, Malicious users often attempt to steal user credentials to popular online websites or services by creating fake sites pretending to be the popular websites, or by stealing personal information stored in legitimate sites such as online commerce or social media websites.

An increasing number of computerized devices such as home appliances, vehicles, and other devices (such as Internet of Things, or IoT devices) are connected to public networks and are also susceptible to unauthorized interception or modification of data. For example, many popular security cameras are known to have vulnerabilities through which attackers can access the device without authorization, enabling the attackers to view and record image data from the cameras or to control camera operation. Similar vulnerabilities are known to exist or may exist in other computer systems and devices, including not only personal computers and smart phones, but also network-connected home security systems such as electronic locks, home appliances such as smart thermostats or kitchen appliances, and vehicles with network access.

In a typical home or corporate network environment, firewalls inspect and restrict the types of communication that can occur between local devices such as computers or IoT devices and the Internet, antivirus programs prevent known malicious code from being loaded or executed on attached computer systems, and malware detection programs detect known malicious code such as remailers, keystroke loggers, and other software that is designed to perform undesired operations such as stealing information from a computer or using the computer for unintended purposes. A firewall or similar network security device in a home or office may be integrated into a router, or may be a standalone device such as a device connected to a router and configured to filter traffic coming into a private network from a public network before forwarding it to devices on the private network.

In a more detailed example of a standalone security device, the device is coupled to a router via a network connection and is configured to receive or intercept data sent between external computer systems and devices on the internal private network, such as by Address Resolution Protocol (ARP) spoofing, Dynamic Host Configuration Protocol (DHCP) settings, Neighborhood Discovery Protocol spoofing for IPv6, or another suitable method. The security device in some home or small office examples is relatively inexpensive and lacks the computing power, cooling, or other resources to perform real-time analysis of network traffic flowing through the device, and so relies on a remote or cloud-based service to perform at least some network traffic analysis.

In one such example of cloud-based traffic analysis, a network appliance monitors network traffic from devices on a public network such as the Internet to local computers on a private network such as a home or small business network, and determines whether to allow the communication between the public and private network devices. The security appliance may lack the processing power or other resources to screen all traffic and so relies on an external remote or cloud server to analyze at least some of the network traffic, such as determining whether to allow a new connection or to allow various content streams to flow between computers. The security appliance therefore forwards the network traffic, characteristics of the network connection, or other such information to a cloud security server which makes a determination as to whether the network security appliance will allow the network traffic. But, the time taken to send the relevant information to the cloud security server and receive a response can result in noticeable lag or latency in establishing a new network connection, and presents an inconvenience to private network device users.

Some examples described herein therefore seek to improve the response time or latency of using a remote or cloud security service to screen network connections by using a network security device that allows a network request between a public network and private network computer to proceed while blocking a response to the request until the cloud security service has approved the network connection, except where a locally cached rule allows the response to proceed without receiving a response from the cloud security service.

In a more detailed example, a network device is used to reduce latency in a cloud security service receiving in the network security device a new network connection request for a connection between a local network device and a remote server. If a locally cached rule is applicable to the new network connection request, the applicable locally cached rule is applied to selectively allow the new network connection based on the rule. If no locally cached rule is applicable to the new network connection request, the new network connection request is forwarded to the remote server and to a cloud security, service, and a response from the remote server is selectively forwarded to the local network device only upon receiving a determination by the cloud security device as to whether the new network connection is a security risk.

In a further example, a new locally cached rule is selectively stored based at least in part on the received data related to the security of the new network connection request from the cloud security device. In another example, the network security device receives information related to whether to allow storing a decision regarding allowing the new network connection request as a locally cached rule from the cloud security service. In a further example, the locally cached rule applies to future events meeting similarity criteria relative to the new network connection, the similarity criteria comprising at least one of server identity, IP address, root domain, port number, protocol, and packet content. In some examples, the local cache comprises rules related to one or more network destinations based on at least one of network destinations commonly visited across a group of users and network destinations commonly visited on one or more local machines.

Figure 1:
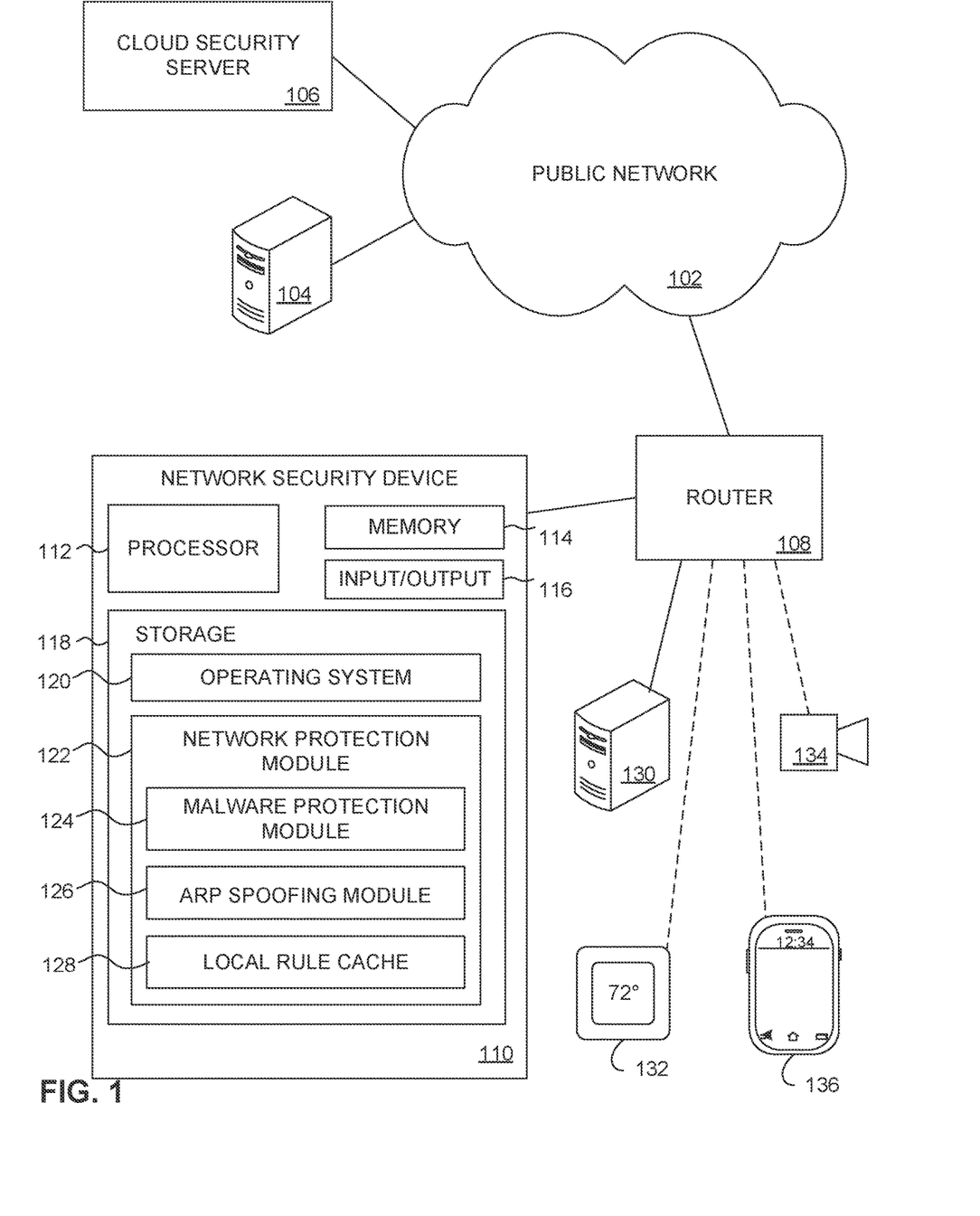
FIG. 1 shows a network environment with a network security appliance, consistent with an example embodiment

FIG. 1 shows a network environment with a network security appliance, consistent with an example embodiment, Here, a public network 102 links remote computer systems such as servers 104 and cloud security server 106 to a private local network via router 108. The private network in this example includes network security device 110, which includes a processor 112, memory 114, input/output 116 (such as a network interface), and storage 118. The storage stores instructions executable on processor 112 to perform certain functions, including operating system 120 and network protection module 122.

The network protection module includes a malware protection module 124 which is operable to inspect traffic between one or more private network devices and the public network 102 for malicious content, as well as to send select network traffic, connection metadata, extracted network traffic features, or other such information to cloud security server 106 for analysis and determination as to whether the network traffic is likely malicious or should otherwise be blocked. ARP spoofing module 126 operable to spoof the IP addresses of the router or gateway and the client devices to insert itself between the devices on the network. Local rule cache 128 stores local rules regarding the safety of a subset of network destinations, such as those network destinations most commonly visited by those on the local network or by others. The private network also includes one or more client devices, such as computer 130, smart thermostat 132, camera 134, and smartphone 136. The network security device in this example is configured to protect the private network devices from threats such as those that might originate from server 104, or from other such threats coming from the public network 102 to the private network.

In operation, a private network device such as computer 130 attempts to establish a network connection to a remote computerized system, such as server 104, via the public network 102. The network security device 110 intercepts the network connection request from computer 130 and forwards it via router 108 and public network 102 to server 104, while extracting low-level characteristics of the network communications request such as the remote server IP address, port number, protocol, packet content, and other such data. The network security device uses these low-level characteristics of the requested network connection to search for a corresponding rule in the local rule cache 128, and if such a rule is found, applies the rule to selectively allow or deny the connection request. In the event no corresponding rule is located in the local cache 128 the response may, in some embodiments, be held from being forwarded to the requesting computer 130 until application of an appropriate rule is complete, such as a rule retrieved from the cloud security server 106. Latency is reduced in some examples by forwarding the network connection request to the remote computerized system before or in parallel with extracting the low-level characteristics of the network connection request, comparing the extracted characteristics to rules in the local rule cache 128, and applying any corresponding rule to the network connection request.

If no corresponding or applicable rule is found in the local rule cache 128, the network security device 110 forwards these extracted characteristics to cloud security server 106 for analysis, and passes the network request on to router 108 to be sent via public network 102 to server 104. Because communication between the network security device and the cloud security server 104 and between the network security device and server 104 happens at the same time, latency in authorizing and establishing the network connection between computer 130 and server 104 is again reduced relative to performing these communications serially. Server 104 receives the network request and sends a response back to computer 130, which is again routed via the public network 102 and router 108 to network security device 110 before being forwarded to the computer 130. The network security device holds the response until an indication of whether the network content is likely malicious or should otherwise be blocked is received from cloud security server 106, at which time the network security device 110 either discards the response from server 104 or forwards the response to computer 130 based on the information received from cloud security server 106.

In a more detailed example, the network security device's malware protection module 124 extracts low-level features of the communication between a local device such as computer 130 and a remote device such as server 104, and uses these characteristics to search for an applicable rule in local rule cache 128 by comparing one or more o the low-level characteristics to corresponding low-level characteristics associated with the rules in the local rule cache. In some examples where more than one rule is applicable to the network connection request, the rule that is the best match or that has the most matching low-level characteristics is selected to be applied, while in other examples the rules are ordered and the first-encountered rule that matches the low-level characteristics of the requested network connection is applied.

If no matching rule is found in the local rule cache, the network security device sends the low-level features to cloud security server 106. The full network traffic therefore need not be sent, which reduces the network traffic and processing load on the cloud security server 106.

In preferred embodiments, the connection between the network security device 110 and the cloud security server 106 is kept open rather than re-established every time a new network event to be sent to the cloud security server is discovered, eliminating any latency that establishing a connection between the security device and cloud security server might add to the delay in establishing a connection between a private network device such as computer 130 and a public network device such as server 104. Because a typical connection between the network security device 110 and cloud security server 106 comprises many steps, including authentication of the user or network security device and establishing a secure or encrypted link by sharing keys or other such information, eliminating this step each time a new network connection between private and public network devices is established can significantly reduce the perceived latency or delay.

Although a single cloud security server 106 is shown in FIG. 1 for simplicity, in practice the cloud security service will typically be provided by many cloud security servers located at various geographic locations and various locations within the public network 102. The round-trip speed of a packet between the network security device 110 and these various cloud security servers can be stablished using a simple ping message sent from the network security device 110 to the various available servers, with round trip message time in milliseconds being returned as the result, or by using any other known method to measure latency. Techniques such as this can be used to select the server that has the fastest reply speed to the network security device, or used in combination with other metrics such as server workload to select a cloud security server 106 that provides the fastest service to the network security device. In a more detailed example; a change from a current connected cloud security server 106 to a new cloud security server is only, made if the new security server provides a response that is better than the response provided by the old server by some threshold amount, such as 10%, 15% 20%, 30%, 50%, or the like.

The network security device 110 is further operable in some embodiments to selectively store rules in local rule cache 128, such as storing rules recently used or that are determined as likely to be used. In one such example, new rules received from cloud security server 106 are stored automatically, with the least-recently used stored rules being replaced in a further example. In another example, the cloud security server 106 may provide a rule with an indication as to whether the rule should or should not be store in the local rule cache, with such indication used in the network security device to determine whether to selectively store the new rule.

The local rule cache in some examples comprises rules that are applicable to websites and/or other network locations that are commonly visited, such as Facebook, Instagram, Pinterest, and the like, so that rules need not be retrieved from the cloud security server 106 to access these network servers. By storing rules relating to these most-visited network locations before a local network device 130-136 initiates a new network connection with one of these locations, latency, network traffic, and load on the cloud security server 106 are significantly reduced. In a further example, such rules are periodically updated such as from cloud security server 106, preferably by downloading a new or updated list of rules to implement.

In a more complex example, some rules such as those provided by the cloud security server 106 as websites commonly visited across a large group of users are static, while other rules such as those used recently by clients on the local network are dynamic. The static rules are changed infrequently, such as by periodic updates from the cloud security server, while the dynamic rules may be changed with each new website or other network connection request from a client on the local network protected by network security device 110. For example, when a local network user visits a website or downloads content from VisitUtah.com, a new rule received from cloud security server 106 indicating that the network destination is safe and authorizing local storage of the rule results in storage of a rule authorizing future network connections to VisitUtah.com. The new rule may replace a dynamic rule, such as the least-recently used dynamic rule stored in local rule cache 128 if the local rule cache is full, but will not replace a static rule provided as part of the core rule set representing network destinations commonly visited across a wide group of users from cloud security server 106.

When methods such as these are combined with a method allowing a request for a new network connection yet to be approved by the network security device proceed but holding the response until the new connection is approved, latency a user perceives in establishing a new network connection can be significantly reduced, resulting in a better user experience.

Figure 2:
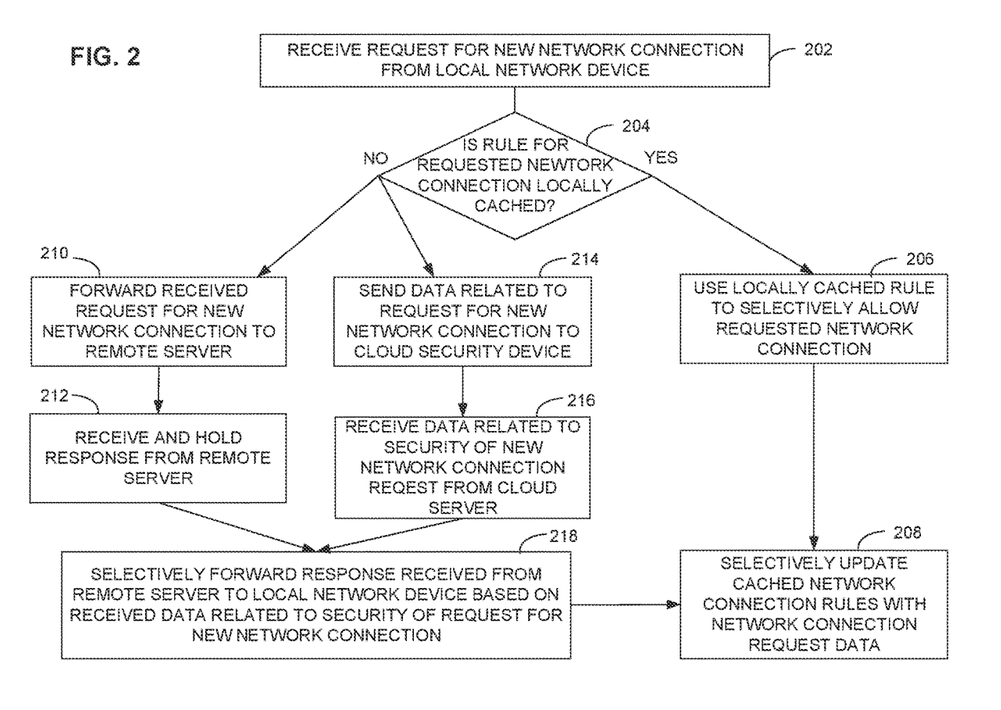
FIG. 2 is a flowchart illustrating a method of reducing latency in a cloud-based security service using a local rule cache, consistent with an example embodiment.

FIG. 2 is a flowchart illustrating a method of reducing latency in a cloud-based security service, consistent with an example embodiment. A network security device, such as may be integrated into a router or firewall, a standalone appliance, or another such device is configured to receive and forward traffic between local network devices such as personal computers, servers, and smart phones on a private network such as a home or business, and public network devices such as web servers. The network security device receives a request for a new network connection from a local network device at 202, such as when a personal computer or smart phone connected to the local private network attempts to make a new connection to a remote server on the Internet. At 204, the network security device determines whether a rule applicable to the requested new network connection is locally cached. If such a rule is locally cached, the locally cached rule is used to selectively allow or deny the requested network connection at 206. In further examples, determination of whether a locally cached rule is applicable to the new network request and applying the rule to the new network request may occur after the new network connection request is sent to the requested network destination, and any response may be held until the steps 204-206 are completed. In another example, the network security device selectively updates the local rule cache with the network connection request result, such as to update the last time the locally cached rule was applied to a network connection request from a local network device.

If there is no locally cached rule that is applicable to the new network connection request at 204, the network security device forwards the received request for a new network connection to the remote server at 210, allowing the process of establishing the new connection to proceed to a limited degree. In the event no corresponding rule is located in the local cache, a response received from the remote server at 212 may be held in the network security device until the new connection is approved. The network security device also sends data related to the request for a new network connection to a cloud security device at 214, such as by extracting low-level features of the new connection such as one or more of destination IP address, port number, service, protocol, and packet content. The cloud security device evaluates the low-level features or other information related to the new connection, and returns a determination as to whether the new connection appears to be potentially risky or malicious. At 216, the network security device receives this determination regarding the risks associated with the new connection and/or other data related to the security of the request for the new network connection from the cloud security server. The received data related to the security or risks associated with the new network connection is used at 218 to selectively forward the response from the remote server received and held at 212, such that the response is forwarded back to the local device originating the new network connection request only if the received data suggests that the new network connection is sufficiently low risk.

In a further example, the could security server is chosen from among multiple available cloud security servers based on the latency of a connection or a message between the network security device and the various cloud security servers A ping message sent to a cloud security server will return a round trip time of transit, providing a metric of the network delay in communicating with each available cloud security server. The fastest cloud security server (or another suitably fast cloud security server) can then be chosen as the could security server to be used for the method of FIG. 2.

In some examples, a connection between the network security device and the cloud security server is kept open or active, such that a new connection need not be established each time the method of FIG. 2 is undertaken. This further reduces latency, in establishing a new network connection between a local device and a remote server, as the network security device need not establish a new network connection each time steps 214 and 216 of FIG. 2 are undertaken. Typically, a new secure connection involves several rounds of passing communication back and forth between two devices, including establishing an initial network link, sending and responding to authentication information, and sending and receiving messages relating to establishing an encrypted or secure link between devices. If these steps can be avoided when communicating between the network security device and the cloud security server in FIG. 2, steps 214 and 216 can be significantly accelerated.

Further, if a connection is kept open or active between the network security device and the cloud security server, the process of searching for and selecting a fast server from among a number of cloud security servers can be adapted to further reduce latency. In one such example, the latency of a connection or message between the network security device and the current cloud server is measured, along with the latency of a connection to at least one additional cloud server. If the fastest additional cloud server is faster than the current cloud server by a threshold amount (such as any amount faster, 5%, 10%, 15%, 20%, 30% or 50% faster), the network security device will establish a connection to the new cloud security server in place of the current cloud security server. In preferred embodiments, connections to more than one cloud security server are kept open or active, or are logged so that should the current server become unavailable or unresponsive another suitably fast cloud security server can be quickly selected.

The network security device in the example of FIG. 1 is a standalone security appliance, but in other examples this functionality may be incorporated into a router, a firewall or gateway, a computer or server, or other such device. Although a router or firewall may be able to intercept network communications to implement the methods described in the examples herein, some devices such as network security appliances may rely on additional methods such as ARP spoofing to insert themselves in the network connection between local network devices and remote or public network devices.

The examples presented here illustrate how allowing a new network connection request to proceed but holding the response until the new connection has been processed by a cloud security server provides significantly reduced latency in establishing the new connection than holding the new network request until the cloud security server processes the new network connection. It also shows how using locally cached rules can reduce the time needed to apply a rule to a new network request, significantly reducing the time, network activity, and server capacity needed to handle new network connection requests. When these methods are combined with other methods such as maintaining a persistent connection to a cloud security server, periodically searching for faster cloud security, servers, and sending low-level metadata reflecting relevant characteristics of the new network connection to the cloud security server rather than the entire new connection packet stream, further improvements to latency in establishing a new connection can be achieved. Although the network security device, cloud security server, and other elements shown in the examples here are shown as implemented on certain computers or computerized devices, a variety of other computerized systems may be used in other examples.

Figure 3:
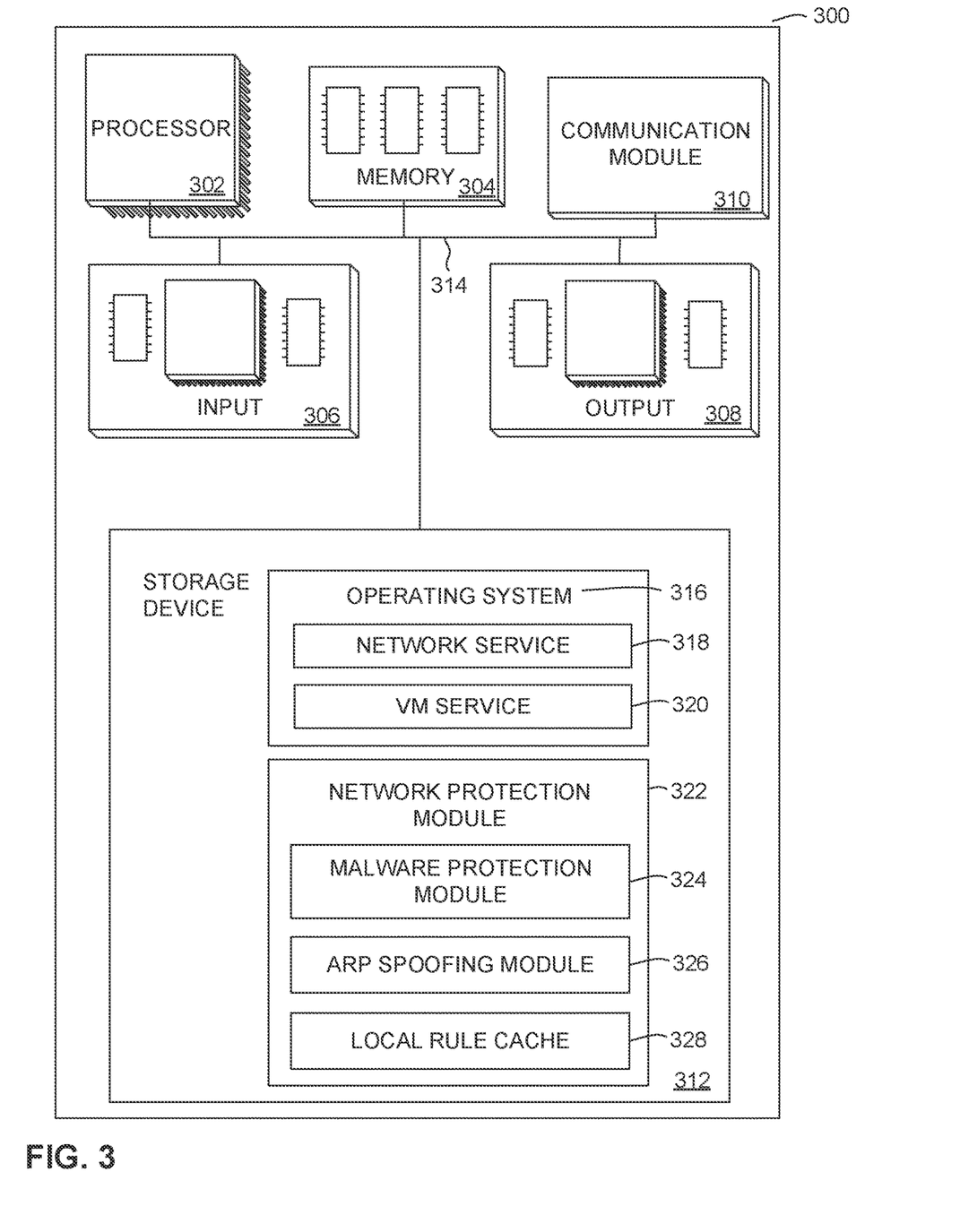
FIG. 3 is a computerized system comprising a network protection module operable to hold a new network connection response while a cloud security server evaluates risk associated with the new connection, consistent with an example embodiment.

FIG. 3 is a computerized system comprising a network protection module operable to hold a new network connection response while a cloud security server evaluates risk associated with the new connection, consistent with an example embodiment. FIG. 3 illustrates only one particular example of computing device 300, and other computing devices 300 may be used in other embodiments, Although computing device 300 is shown as a standalone computing device, computing device 300 may be any component or system that includes one or more processors or another suitable computing environment for executing software instructions in other examples, and need not include all of the elements shown here.

As shown in the specific example of FIG. 3, computing device 300 includes one or more processors 302, memory 304, one or more input devices 306, one or more output devices 308, one or more communication modules 310, and one or more storage devices 312. Computing device 300, in one example, further includes an operating system 316 executable by computing device 300. The operating system includes in various examples services such as a network service 318 and a virtual machine service 320 such as a virtual server. One or more applications, such as network protection module 322 are also stored on storage device 312, and are executable by computing device 300.

Each of components 302, 304, 306, 308, 310, and 312 may be interconnected (physically, communicatively, and/or operatively) for inter-component communications, such as via one or more communications channels 314. In some examples, communication channels 314 include a system bus, network connection, inter-processor communication network, or any other channel for communicating data. Applications such as network protection module 322 and operating system 316 may also communicate information with one another as well as with other components in computing device 300.

Processors 302, in one example, are configured to implement functionality and/or process instructions for execution within computing device 300. For example, processors 302 may be capable of processing instructions stored in storage device 312 or memory 304. Examples of processors 302 include any one or more of a microprocessor, a controller, a digital signal processor (DSP), an application specific integrated circuit (ASIC), a field-programmable gate array (FPGA), or similar discrete or integrated logic circuitry.

One or more storage devices 312 may be configured to store information within computing device 300 during operation. Storage device 312, in some examples, is known as a computer-readable storage medium. In some examples, storage device 312 comprises temporary memory, meaning that a primary purpose of storage device 312 is not long-term storage, Storage device 312 in some examples is a volatile memory, meaning that storage device 312 does not maintain stored contents when computing device 300 is turned off. In other examples, data is loaded from storage device 312 into memory 304 during operation. Examples of volatile memories include random access memories (RAM), dynamic random access memories (DRAM), static random access memories (SRAM), and other forms of volatile memories known in the art. In some examples, storage device 312 is used to store program instructions for execution by processors 302. Storage device 312 and memory 304, in various examples, are used by software or applications running on computing device 300 such as network protection module 322 to temporarily store information during program execution.

Storage device 312, in some examples, includes one or more computer-readable storage media that may be configured to store larger amounts of information than volatile memory. Storage device 312 may further be configured for long-term storage of information. In some examples, storage devices 312 include non-volatile storage elements. Examples of such non-volatile storage elements include magnetic discs, optical discs, flash memories, or forms of electrically programmable memories (EPROM) or electrically erasable and programmable (EEPROM) memories.

Computing device 300, in some examples, also includes one or more communication modules 310. Computing device 300 in one example uses communication module 310 to communicate with external devices via one or more networks, such as one or more wireless networks. Communication module 310 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 300 uses communication module 310 to wirelessly communicate with an external device such as via public network 102 of FIG. 1.

Computing device 300 also includes in one example one or more input devices 306. Input device 306, in some examples, is configured to receive input from a user through tactile, audio, or video input. Examples of input device 306 include a touchscreen display, a mouse, a keyboard, a voice responsive system, video camera, microphone or any other type of device for detecting input from a user.

One or more output devices 308 may also be included in computing device 300. Output device 308, in some examples, is configured to provide output to a user using tactile, audio, or video stimuli. Output device 308, in one example, includes a display, a sound card, a video graphics adapter card, or any other type of device for converting a signal into an appropriate form understandable to humans or machines. Additional examples of output device 308 include a speaker, a light-emitting diode (LED) display, a liquid crystal display (LCD), or any other type of device that can generate output to a user.

Computing device 300 includes operating system 316 in some examples. Operating system 316, in some examples, controls the operation of components of computing device 300, and provides an interface from various applications such as network protection module 322 to components of computing device 300. For example, operating system 316, in one example, facilitates the communication of various applications such as network protection module 322 with processors 302, communication unit 310, storage device 312, input device 306, and output device 308. Applications such as network protection module 322 may include program instructions and/or data that are executable by computing device 300. As one example, network protection module 322 executes a malware protection module 324 program instruction sequence that evaluates network traffic, including establishing new network connections between local computers and remote systems on a public network, for risks such as malware. In a more detailed example, the malware protection module communicates with a cloud security server to perform at least some analysis of network traffic, and is operable to hold a new network connection response while a cloud security server evaluates risk associated with the new connection. An ARP spoofing module 326 enables the computerized device 300 to insert itself in a local network between a router or gateway and various local computerized systems by associating the IP addresses of other network devices with its own MAC address, enabling the computerized device to intercept and selectively filter network traffic between local devices and a public network. A local rule cache 328 stores rules that are commonly used, such as for network destinations that are particularly common among local users and/or a larger group of users, so that the rules can be applied to new network connection requests without querying the cloud security server. These and other program instructions or modules may include instructions that cause computing device 300 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of reducing latency in a cloud security service, comprising:
   receiving, in a network security device, a new network connection request from a local network device to a remote network device;
   determining whether at least one locally cached rule applies to the new network connection request;
   if a locally cached rule applies to the network connection request, selectively approving the network connection request based on the rule; and
   if a locally cached rule does not apply to the network connection request,
      forwarding the new network connection request to the remote network device and receiving a response from the remote device in the network security device;
      sending data related to the new network connection request from the network security device to a cloud security device and receiving, by the network security device from the cloud security device, data related to the security of the new network connection request; and
      selectively forwarding the response received from the remote server from the network security device to the local network device based at least in part on the received data related to the security of the request for the new network connection.

2. The method of reducing latency in a cloud security service of claim 1, further comprising selectively storing a locally cached rule on the cloud security device based at least in part on the received data related to the security of the new network connection request from the cloud security device.

3. The method of reducing latency in a cloud security service of claim 2, wherein the received data related to the security of the new network connection request from the cloud security device comprises information related to whether to allow storing a decision regarding allowing the new network connection request as a locally cached rule.

4. The method of reducing latency in a cloud security service of claim 2, wherein the locally cached rule applies to future events meeting similarity criteria relative to the new network connection request.

5. The method of reducing latency in a cloud security service of claim 4, wherein similarity criteria comprise at least one of server identity, IP address, root domain, port number, protocol, and packet content.

6. The method of reducing latency in a cloud security service of claim 1, wherein the local cache comprises rules related to one or more network destinations based on commonly visited across a group of users.

7. The method of reducing latency in a cloud security service of claim 1, wherein the local cache comprises rules related to one or more network destinations commonly visited on one or more local machines.

8. The method of reducing latency in a cloud security service of claim 1, further comprising extracting low-level characteristics of the new network connection in the network security device and sending the extracted low-level characteristics as data related to the request for the new network connection to the cloud security service, wherein the low-level characteristics comprise at least one of remote server IP address, port number, protocol, and packet content.

9. The method of reducing latency in a cloud security service of claim 1, further comprising maintaining a persistent connection between network security device and the cloud security device such that a new connection need not be established for the sending data related to the request for the new network connection from the network security device to the cloud security device.

10. The method of reducing latency in a cloud security service of claim 1, further comprising searching for a cloud security device having the fastest connection to the network security device, and changing from a current cloud security device to a new cloud security device if the new cloud security device connection is faster than the connection to the current cloud security device by a threshold amount.

11. The method of reducing latency in a cloud security service of claim 1, wherein the network security device comprises a router, a firewall, or a special-purpose network security device.

12. The method of reducing latency in a cloud security service of claim 1, wherein selectively forwarding comprises receiving a determination of whether to allow the connection from the cloud security server and selectively forwarding based at least in part on the received determination.

13. The method of reducing latency in a cloud security service of claim 1, wherein selectively forwarding comprises determining in the network security device whether to allow the connection, based at least in part on the received data related to the security of the request for the new network connection.

14. A network security device, comprising:
a processor, a memory, one or more network connections, and machine-readable instructions executable on the processor when loaded into the memory, the machine-readable instructions operable when executed to cause the network security device to:
receive a request for a new network connection from a local network device to a remote server;
determine whether at least one locally cached rule applies to the new network connection request;
if a locally cached rule applies to the network connection request, selectively approve the network connection request based on the rule; and
if a locally cached rule does not apply to the network connection request:
forward the received request for the new network connection to the remote server;
send data related to the request for the new network connection to the cloud security device and receive a response from the remote server comprising data related to the security of the request for the new network connection from the cloud server; and
selectively forward the response received from the remote server to the local network device based at least in part on the received data related to the security of the request for the new network connection.

15. The network security device of claim 14, the machine-readable instructions further operable when executed to selectively store a locally cached rule based at least in part on the received data related to the security of the new network connection request from the cloud security device.

16. The network security device of claim 15, wherein the received data related to the security of the new network connection request from the cloud security device comprises information related to whether to allow storing a decision regarding allowing the new network connection request as a locally cached rule, and wherein the locally cached rule applies to future events meeting similarity criteria relative to the new network connection, the similarity criteria comprising at least one of server identity, IP address, root domain, port number, protocol, and packet content.

17. The network security device of claim 14, wherein the local cache comprises rules related to one or more network destinations based on at least one of network destinations commonly visited across a group of users and network destinations commonly visited on one or more local machines.

18. The network security device of claim 14, the machine-readable instructions further operable when executed to extract low-level characteristics of the new network connection in the network security device and send the extracted low-level characteristics as data related to the request for the new network connection to the cloud security service, wherein the low-level characteristics comprise at least one of remote server IP address, port number, protocol, and packet content.

19. The network security device of claim 10, the machine-readable instructions when executed further operable to maintain a persistent connection between network security device and the cloud security device such that a new connection need not be established for the sending data related to the request for the new network connection from the network security device to the cloud security device.

20. A method of reducing latency in a cloud security service, comprising:
receiving in a network security device a new network connection request for a new network connection between a local network device and a remote serve;
if a locally cached rule is applicable to the new network connection request, applying the applicable locally cached rule to selectively allow the new network connection based on the rule; and
if no locally cached rule is applicable to the new network connection request, forwarding the new network connection request to the remote server and to a cloud security service, and selectively forwarding a response from the remote server to the local network device only upon receiving a determination by the cloud security device as to whether the new network connection is a security risk.

* * * * *